(No Model.)
D. W. PAYNE.
METHOD OF ATTACHING RAIL BONDS TO RAILS OF ELECTRIC RAILROADS.
No. 560,366. Patented May 19, 1896.
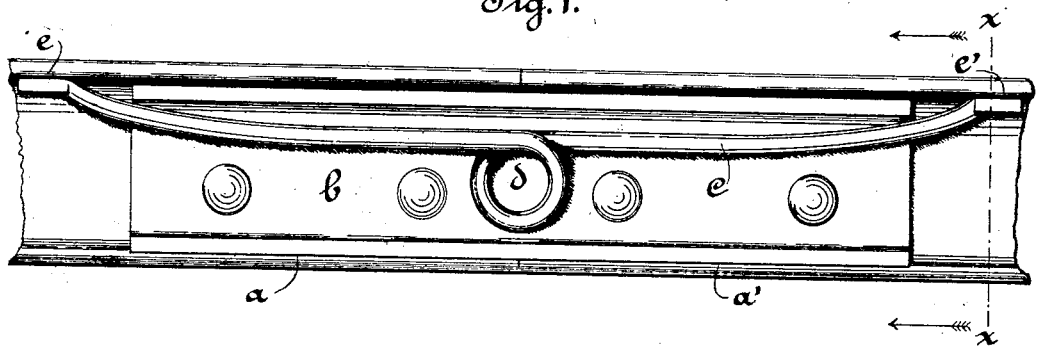
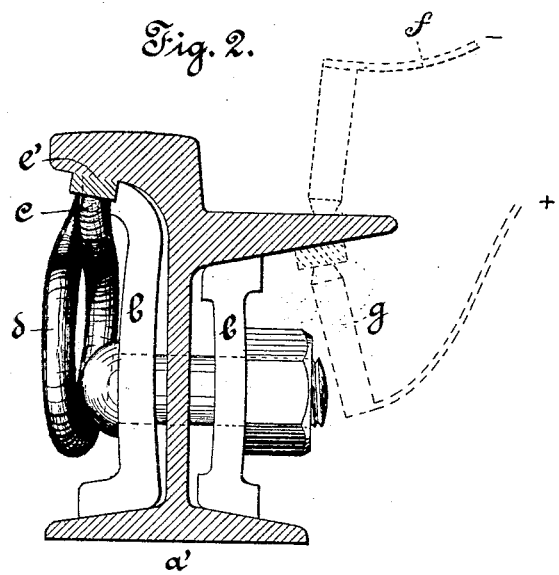
WITNESSES:
A. S. Diven 2d
H. H. Mills
INVENTOR
David W. Payne
BY
Eugene Diven
ATTORNEY.

UNITED STATES PATENT OFFICE.

DAVID W. PAYNE, OF ELMIRA, NEW YORK.

METHOD OF ATTACHING RAIL-BONDS TO RAILS OF ELECTRIC RAILROADS.

SPECIFICATION forming part of Letters Patent No. 560,366, dated May 19, 1896.

Application filed August 24, 1895. Serial No. 560,442. (No specimens.)

*To all whom it may concern:*

Be it known that I, DAVID W. PAYNE, a citizen of the United States, residing at Elmira, in the county of Chemung and State of New York, have invented a new and useful Improvement in Methods of Attaching Rail-Bonds to the Rails of Electric Railroads; and I do hereby declare that the following is a full, clear, and exact description of the invention, which will enable others skilled in the art to which it appertains to use the same.

The various methods of attaching rail-bonds now in use depend upon drilling the rails and inserting and fastening the bonds in the holes so made. By reason of expansion or the constant jarring of the rail-joint these bonds sooner or later become loosened and fail to perform their function. In order that the electrical resistance may be as low as possible, the preferable method of attaching the bonds to the rails is by welding or brazing, as by this integral union of the bond and rail the resistance is reduced far below that of any mechanical joint and the action of electrolysis is overcome. Many difficulties present themselves when it is attempted to weld or braze a bond to the rails, especially as this must be done when the rails are in place upon the road-bed. In this awkward position a high degree of heat must be concentrated upon the rail at the point of attachment. Unless the heat is localized much valuable time must be consumed in bringing the rail to the required temperature, since the conductivity of the rail causes the heat to spread throughout its length if not applied very quickly. The greatest difficulty, however, arises from the nature of the two metals to be joined. As the bonding-strip is small in cross-section in comparison to the rails, it must be made of metal having a higher degree of conductivity; otherwise there will be resistance and leakage. Copper, the most available metal having the necessary degree of conductivity, has at the same time a lower point of fusion than the rail, an obstacle which must be overcome in making a properly welded or brazed joint. If heat is applied equally to the rail and bond at the same time, the copper of the bond will be burned before the iron of the rail is brought to the necessary temperature. With these difficulties in view many attempts have been made to make a welded or brazed joint between bond and rail; but none, so far as I am aware, has been practically successful. In one instance a bond has been welded to a rail; but in order to accomplish this a large "chock" is first welded to the bond and afterward this chock is welded to the rail by the cumbersome apparatus used in welding the ends of the rails together.

It is the object of my invention to weld or braze any of the ordinary metallic bonds (though I prefer to use bonds of copper) directly to the rails, and I attain this object by localizing a very high degree of heat at the point of juncture, preferably by means of electricity.

In the accompanying drawings I have shown a bond made in accordance with my invention.

Figure 1 shows the bond in place upon the contiguous ends of two rails, the rails being joined together by the usual fish-plates. Fig. 2 is a section of Fig. 1 on the line $x\,x$, looking in the direction of the arrows.

$a$ and $a'$ indicate the two rails, $b$ the fish-plate, and $c$ the metallic bond. This bond has a loop $d$ midway between its ends to provide for vertical or longitudinal movement in the rails.

$e$ and $e'$ are the points where the ends of the bond have been welded or brazed into place upon the rails.

To carry my invention into effect, I employ a portable apparatus consisting of a dynamo, actuated by any convenient motor, and an emery-wheel upon the end of a flexible shaft, which is driven by the dynamo-motor or by any other desirable means. The wires leading from the opposite poles of the dynamo are each attached to carbon points, which are to be applied to the rail and bond in the manner hereinafter set forth.

By "carbon point" I do not mean, literally, a pointed stick of carbon, but any shape of carbon which, when the current of electricity is passing through it, will become heated to a high temperature immediately at the point where it is applied to the surface to be heated, thus imparting its heat quickly and solely to said surface, and practically only to the extent of such surface, it being the idea to impart the heat of the carbon to the metal very quickly and before it can be conducted away through the mass of the metal.

My apparatus is moved to the vicinity of the rails to be bonded. A bright spot is made with the emery-wheel near the ends of each rail at the points selected for attaching the bond. The carbon points $f$ and $g$ are then applied to this brightened spot directly opposite each other and the current turned on. This current is preferably of low voltage and high amperage. In an extremely short period of time the rail is brought to or near to the temperature requisite for welding immediately at the point acted upon. The bond is then slipped in between one of the carbon points and the rail, and the application of the current continued until bond and rail are both at the requisite temperature, when the current is shut off and the joint allowed to cool. It will be seen that by this method of procedure the rail and bond are brought to their respective welding-points at the same time and danger of overheating the softer metal avoided. The operation is repeated upon the other rail and the other end of the bond, and the bonding is complete. I prefer, however, to use two sets of carbon points and weld both ends of the bond at the same time.

A brazed joint may be preferable to a welded one, especially as it can be made at a lower temperature, and my device readily accomplishes this, it only being necessary to interpose a suitable brazing material between rail and bond. By this method I do away with drilling the rails and am enabled to quickly and easily attach the bond to any form of rail and at any desirable point thereupon, and I may use a very short bond, as illustrated, it not being necessary to span the fish-plate, as is now the common practice. I can thus save a large item of expense, as I do away with much unnecessary and expensive metal.

More than one bond may be placed at each rail-joint, if desired. In the drawings I have shown the bond attached beneath the head of a girder-rail. By the broken lines, Fig. 2, I have indicated a second bond beneath the flange of the rail, and have also indicated carbon points in position for welding.

Although I prefer to use an electric current of low voltage for obvious reasons, I do not wish to be understood as limiting myself to this, as a current of high voltage may be used and an arc formed from the carbon points to the metals to be welded.

It will be noticed that I do not use the rail or bond as a conductor of the electric current, but pass the current directly across the juncture of rail and bond through one carbon into the other, the carbon points rapidly attaining a high degree of heat and transmitting it to the rail and bond.

I do not restrict myself to any particular form of bond nor to any particular form of apparatus for carrying my invention into effect.

I am aware of the patent to Elihu Thomson for electric soldering, No. 496,019, dated April 25, 1893, in which sheet-metal pieces are soldered or cemented together by clamping them between two points of electrical resistance, these resistance-points being faced with hard carbon; but by my method I do more than this—that is, I make a welded or brazed joint (not a soldered joint) between two metals having different points of fusion. While this patent involves, broadly, the principles employed in my invention, the difficulties attending my operation are not designed to be overcome by the patent, neither is there a method disclosed or claimed therein that can attain my result.

What I therefore claim as my invention, and desire to secure by Letters Patent, is—

1. The method of welding or brazing rail-bonds directly to the rails when laid upon a road-bed which consists in first heating a rail to, or near to, the required temperature at the place of juncture and then inserting the end of the bond between the rail and the source of heat, and continuing the application of heat until the bond and rail are both brought to the required temperature at their place of juncture, substantially as described.

2. The method of welding or brazing rail-bonds directly to the rails when laid upon a road-bed which consists in first heating a rail to, or near to, the required temperature at the place of juncture by means of an electrically-heated carbon point applied thereto, and then inserting the end of the bond between rail and carbon point and continuing the application of the electric current until both rail and bond are brought to the required temperature at their place of juncture, substantially as described.

3. The herein-described method of welding or brazing rail-bonds directly to the rails when laid upon a road-bed which consists in applying carbon points to the rails on opposite sides thereof at the points selected for bonding, passing a current of electricity from carbon point to carbon point until the rails are heated to, or near to, the desired temperature, then inserting the ends of the bond between the rails and the proper carbon points, and continuing the application of the current until both bond and rails are brought to the required temperature.

DAVID W. PAYNE.

Witnesses:
H. H. MILLS,
SAMUEL BABCOCK.